Nov. 2, 1965

R. B. BURTT

METHOD OF MANUFACTURING MULTIPLE PHOTO-CATHODE CATHODE RAY TUBES

Filed May 9, 1962

3,215,484

INVENTOR

Roger Brian Burtt

BY Baldwin & Wight

ATTORNEYS 3,215,484
Patented Nov. 2, 1965

3,215,484

METHOD OF MANUFACTURING MULTIPLE PHOTO-CATHODE CATHODE RAY TUBES

Roger Brian Burtt, Terling, Essex, England, assignor to English Electric Valve Company Limited, London, England, a British company Filed May 9, 1962, Ser. No. 193,443
Claims priority, application Great Britain, May 11, 1961, 17,222/61
3 Claims. (Cl. 316—18)

Figures 1, 2, 3, 4:
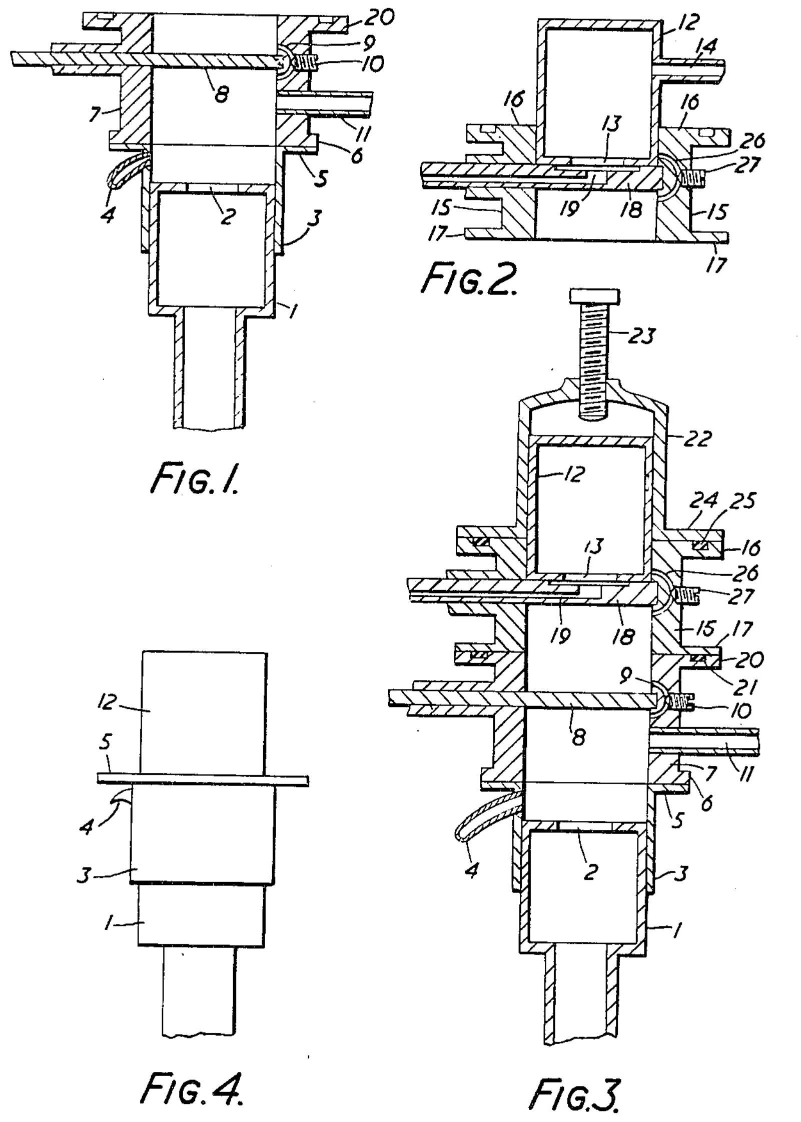

This invention relates to the manufacture of cathode ray tubes and more specifically to cathode ray tubes of the kind in which there are two, or more, photo-electric cathodes. For the sake of brevity in description tubes of this kind will hereinafter be referred to as multiple photo-cathode cathode ray tubes.

A well known example of a multiple photo-cathode cathode ray tube is that known as the image intensifier camera tube. This tube consists in essence of a structural combination of one or more image intensifier stages with a camera tube scanning stage. A typical image intensifier stage includes a thin glass film coated on one side with a suitable phosphor and on the other with a photo-cathode. Electrons impinging a spot on the phosphor produce a light spot which, acting through the glass film on the photo-cathode, causes photo-electron emission from a corresponding spot thereon. The emitted photo-electrons are accelerated to high velocity and may be either projected on to the phosphor of a further image intensifier stage or, if the one intensifier stage is enough, may be projected directly on to the camera tube stage by means of which video signals are produced in the customary well known way. In a typical image intensifier camera tube of the image orthicon type there is, on one end of the tube, a photo-cathode on which a light image of a subject for transmission is projected. The resultant photo-emission is accelerated on to the phosphor of an image intensifier stage forming part of the tube structure and the resultant photo-emission from the cathode of this stage is either passed directly to the image or hicon stage provided in the tube or, if desired, is subjected to further intensification by one (or more) further image intensifier stages incorporated in the tube, the photo-emission from the photo-cathode of the last image intensifier stage being passed to the image orthicon stage where video signals are produced in well-known manner by scanning a target with a cathode ray.

It will be seen that such an image intensifier camera tube always incorporates a number of photo-cathodes, the actual number in any particular tube depending on the number of image intensifier stages and increasing by one for each added image intensifier stage in the tube. In such tubes, and in other multiple photo-cathode cathode ray tubes as at present in general use, it has been usual or necessary simultaneously to process all the photo-cathodes in manufacture. Considerable difficulty is experienced in obtaining satisfactory photo-cathodes when two (or more) are processed in the same evacuated space either simultaneously or one at a time. In the latter case processing of one may damage another and, in the former, unavoidable differences between individual photo-cathodes seldom permit them to be processed (if best results are to be obtained) in exactly the same way and, in general, different cathodes will be found to require substantially different processing. When there are three photo-cathodes to be processed simultaneously it is extremely difficult to do so satisfactorily and the satisfactory simultaneous processing of more than three such cathodes is, with present-day materials, methods and knowledge, so difficult as to be almost impossible.

The present invention seeks to avoid the difficulties inherent in the simultaneous processing of the cathodes of a multiple photo-cathode cathode ray tube and according to this invention the multiple photo-cathode cathode ray tube to be manufactured will include at least two separately manufactured sections each completely enclosing a volume bounded by the walls of the section in question, at least one of said sections housing a photo-cathode and no section containing within its volume more than one photo-cathode. This construction of tube overcomes the difficulties mentioned hereinbefore because the different photo-cathodes can be separately processed while in a separate evacuated space.

Preferably each separately manufactured section has one closure wall constituted by a glass or like membrane.

One form of image intensifier camera tube produced in accordance with the method of the invention includes a separately manufactured section closed at one end by a glass or like membrane with a photo-cathode on its inner surface and housing a camera tube stage; a second separately manufactured section also closed at one end by a glass or like membrane and having a photo-cathode inside it, the last mentioned membrane having a phosphor on its inner surface; and an envelope wall member mechanically uniting the two sections with their membranes substantially in contact, the two membranes being enclosed by the envelope wall member.

In a modified form of image intensifier camera tube manufactured in accordance with the method of the invention there is a separately manufactured section closed at one end by a glass or like membrane with a photo-cathode on its inner surface and housing a camera tube stage; a second separately manufactured section also closed at one end by a glass or like membrane and having a photo-cathode inside it, the last mentioned membrane having a phosphor on its inner surface; at least one additional separately manufactured section closed at one end by a glass or like membrane and having a photo-cathode inside it; and a plurality of envelope wall members mechanically uniting the sections in a single structure with the membranes positioned at desired intermediate positions between the two ends of the whole structure, the total volume enclosed in the whole structure being thus divided by walls of the sections into separate sub-volumes.

According to a feature of this invention a method of manufacturing a multiple photo-cathode cathode ray tube includes the steps of separately manufacturing at least two sections, each having one closure wall constituted by a glass or like membrane, and each having a photo-cathode within it; fitting an envelope wall member to the membrane end of one of said sections to extend beyond the same; mounting a temporary closure member having an openable valve over the far end of said envelope wall member; simultaneously exhausting said one section and the space between the membrane end thereof and the openable valve while said valve is closed; fitting a second temporary closure member also having an openable valve over the membrane end of the other section; simultaneously exhausting said other section and the space outwardly of the membrane thereof while the valve in the said second temporary closure member is closed; assembling the two temporary closure members with a further closure member to form an assembly consisting of both sections the envelope wall member, and both temporary closure members, said assembly enclosing a space which is bounded at one end by the membrane of said other section, and is subdivided by the two closed valves (which are now between the membranes of the two sections); separately processing the photo-cathodes when the spaces in which they are situated are in exhausted condition; opening by-passes across the valves and exhausting those spaces in the assembly which are put into communication through the by-passes; opening the valves; bringing the two sections towards one another by sliding one along inside the assembly until the membranes of both sections are substantially in contact and both within the envelope wall member; fixing the sections in their new relative positions; sealing off; and sliding off the closure members.

Where said one section is a camera tube section the method set forth in the last preceding paragraph will result in an image intensifier camera tube with one image intensifier stage. Obviously the process can be modified or extended to produce image intensifier camera tubes with at least two intensifier stages by separately manufacturing at least one additional section with a glass or like membrane at one end and a photo-cathode inside it and a phosphor on the inner surface of said membrane and providing a further temporary closure member with an openable by-passed valve for each additional section whereby, when said member is fitted over the membrane end of such additional section, the interior space thereof and the space outwardly of its membrane and the valve can be exhausted, thus permitting each photo-cathode to be independently processed while in an evacuated space containing no other photo-cathode.

The invention is illustrated in the accompanying drawings which show various stages in the manufacture of an image orthicon image intensifier tube. For simplicity of illustration and description the tube chosen for illustration is one having only one image intensifier stage. As already stated, however, there may be more than one image intensifier stage and it will be obvious how the method of manufacture now to be described may be modified and extended to such tubes. FIGURES 1 to 3 are sectional views and FIGURE 4 is an elevation of the finished tube. All the figures are simplified for purposes of clarity by the omision of interior and other parts not necessary to an understanding of the invention.

Referring to the drawings and first to FIGURE 1, 1 is the envelope of an image orthicon tube section which is of normal well known construction except that a thin glass membrane 2 replaces the normally provided glass end face plate of an ordinary image orthicon tube. A flanged tubular glass envelope wall member 3 which will ultimately form part of the envelope of the finished tube construction is sealed or glued over the imaging end of the tube section 1. A pumping-out tail 4 (sealed off at this stage of manufacture) is provided in the member 3, the flange of which, referenced 5, is ground flat. Against this flange is placed the flat ground flange 6 of a temporary tubular closure member 7 which contains a retractable valve 8 (shown in the closed position) and has a second flange 20 at its other end. A by-pass 9, which is normally closed by a screwed plug member 10, is able, when the plug is opened, to connect the volumes on the two sides of the valve 8. The ground faces of the flanges 5 and 6 are flat enough to give a reasonably good vacuum seal. A pumping-out tail 11 communicates with the space in the temporary closure member between the valve 8 and the membrane 2.

With these parts assembled as shown in FIGURE 1, the volume inside the image orthicon section 1 on one side of the membrane 2 and the volume between the membrane 2 and the closed valve 8 can be exhausted together, the difference in pressure between the two sides of the membrane 2 being kept below that which said membrane can withstand without shattering. When the interior of the image orthicon section 1 is exhausted its photo-cathode on the membrane 2 and inside the envelope of this section can be independently processed in known manner to produce a satisfactory finished photo-cathode. It will be observed that this photo-cathode is the only one in the evacuated space in which the processing takes place. The orthicon section can then be sealed off and while still keeping the apparatus as shown in FIGURE 1 in assembled position and the exhausting pump attached to the tail 11 still working, the said apparatus may be left for the time being.

Refer now to FIGURE 2. This shows an image intensifier section 12 closed at one end by a glass membrane 13 and having a pumping-out tail 14. On the inside surface of the membrane 13 is a phosphor layer (not shown). The end of the section 12 opposite the membrane 13 is constituted by a face plate of normal construction. A temporary closure member 15, flanged at both ends as shown at 16 and 17 is fitted over the membrane end of the section 12. In this temporary closure member is a withdrawable valve 18 which is shown in closed position and has a central passage 19 for connection to an exhaustion pump. A by-pass 26 with plug 27 (corresponding to the by-pass 9 and plug 10 of FIGURE 1) can, when the plug is open by-pass the valve 18.

The interior of the section 12 is exhausted through the tail 14 and the space outwardly of the membrane 13 is simultaneously exhausted through the passage 19, keeping the pressure difference across the membrane 13 low enough to avoid risk of breaking it. When exhaustion has occurred the photo-cathode inside the section 12 is processed in manner known per se. The said section 12 is then sealed off by sealing off the tail 14, still, however, keeping the pump continuously exhausting through the passage 19 to maintain vacuum on the outside of the membrane 13.

The remaining operations of manufacture may be carried out at room temperature with necessary vacuum retention by rubber or similar vacuum seals. The apparatus shown in FIGURE 2 (with the pump still exhausting through the passage 19) is fitted over the apparatus shown in FIGURE 1 with the flange 17 against the flange 20 and a suitable vacuum retaining rubber ring 21 being interposed between the two flanges. A closure member 22 formed as a vacuum tight cover with a screwed stem 23 passing through it is fitted over the section 12. This cover has a flange 24 which meets the flange 16 with a vacuum tight rubber ring 25 between them. This stage in assembly is shown in FIGURE 3. The by-passes 9 and 26 are now opened and exhaustion of those spaces inside the assembly of FIGURE 3 and not already exhausted is completed. When this has been done, the two valves 8 and 18 are fully retracted and the section 12 moved along inside the assembly by means of the screw 23 until it enters the envelope member 3 and the membranes 2 and 13 are substantially in contact. The end of the tail 4 is then immersed in a suitable adhesive (for example epoxy resin or melted wax) and the sealing glass pip broken off so that adhesive is forced by atmospheric pressure up the tail 4 to seal the section 12 in the required position to which it has been moved in the envelope member 3. When the adhesive has hardened the cover plate 22 and the temporary closure members with their valves are slid off leaving a completed image intensifier image orthicon camera tube, the outline of which will be as represented in FIGURE 4.

I claim:

1. A method of manufacturing a multiple photo-cathode cathode ray tube, said method including the steps of separately manufacturing at least two sections, each having one closure wall constituted by a glass or like membrane, and each having a photo-cathode within it; fitting an envelope wall member to the membrane end of one of said sections to extend beyond the same; mounting a temporary closure member having an openable valve over the far end of said envelope wall member; simultaneously exhausting said one section and the space between the membrane end thereof and the openable valve while said valve is closed; fitting a second temporary closure member also having an openable valve over the membrane end of the other of said sections; simultaneously exhausting said other section and the space outwardly of the membrane thereof while the valve in the said second temporary closure member is closed; assembling the two temporary closure members with a further closure member to provide an assembly comprising said two sections, said envelope wall member, and said temporary closure members, said assembly enclosing a space which is bounded at one end by the membrane of said other section, and is subdivided by the two closed valves, said valves being positioned between the membranes of the two sections; separately processing the photo-cathodes when the spaces in which they are situated are in exhausted condition; opening by-passes across the valves and exhausting those spaces in the assembly which are put into communication through the by-passes; opening the valves; bringing the two sections towards one another by sliding one along inside the assembly until the membranes of both sections are substantially in contact and both within the envelope wall member; fixing the sections in their new relative positions; sealing off; and sliding off the closure members.

2. A method of manufacturing a multiple photo-cathode cathode-ray tube including the following steps: providing two separate sections, each having one closure wall comprising a transparent membrane and each having a photo-cathode within it; assembling the two sections together with intermediate closure means providing a pressure-tight fit over the membrane end of each section and having closed but openable valve means extending over the area of the assembly intermediate the two membranes, the two volumes immediately exterior of the membranes with respect to the sections being exhausted independently; exhausting the volume between the membranes additional to said two volumes; opening the valve means completely; and sliding one section through the assembly until the two membranes are in contact.

3. A method of manufacturing a multiple photo-cathode cathode ray tube including the following steps: providing two separate sections, each having one closure wall comprising a transparent membrane and each having a photo-cathode within it; fitting in a pressure-tight manner two closure members, respectively, to the membrane end of each section to extend beyond the same, each of said closure members having valve means therein; exhausting simultaneously the volumes on both sides of one membrane, the respective valve means being closed; exhausting simultaneously the volumes on both sides of the other membrane, the respective valve means being closed; processing each photo-cathode when the respective section is exhausted; fitting together the ends of the closure members remote from the sections; exhausting the volume between the valve means; opening the valve means completely; and sliding one section through the closure members until the two membranes are in contact.

References Cited by the Examiner

UNITED STATES PATENTS

| | | | |
|---|---|---|---|
| 2,153,614 | 4/39 | Coeterier et al. | 313—65 |
| 2,508,979 | 5/50 | Van Gessel | 29—25.13 |
| 2,879,583 | 3/59 | Booth et al. | 29—25.13 |
| 2,928,969 | 3/60 | Schneeberger | 313—65 |

FRANK E. BAILEY, *Primary Examiner.*

ARTHUR GAUSS, *Examiner.*